United States Patent
Stella

(10) Patent No.: US 9,361,531 B2
(45) Date of Patent: Jun. 7, 2016

(54) TARGETED OPTICAL CHARACTER RECOGNITION (OCR) FOR MEDICAL TERMINOLOGY

(71) Applicant: Optum, Inc., Minnetonka, MN (US)

(72) Inventor: Casey Stella, Solon, OH (US)

(73) Assignee: Optum, Inc., Minnetonka, MN (US)

( * ) Notice: Subject to any disclaimer, the term of this patent is extended or adjusted under 35 U.S.C. 154(b) by 6 days.

(21) Appl. No.: 14/336,416

(22) Filed: Jul. 21, 2014

(65) Prior Publication Data

US 2016/0019430 A1  Jan. 21, 2016

(51) Int. Cl.
| | |
|---|---|
| *G06K 9/03* | (2006.01) |
| *G06K 9/18* | (2006.01) |
| *G06K 9/00* | (2006.01) |
| *G06K 9/72* | (2006.01) |
| *G06K 9/62* | (2006.01) |
| G06K 9/20 | (2006.01) |
| G06F 3/0488 | (2013.01) |

(52) U.S. Cl.
CPC .. *G06K 9/03* (2013.01); *G06K 9/18* (2013.01); *G06K 9/6277* (2013.01); *G06K 9/72* (2013.01); G06F 3/04883 (2013.01); G06K 9/2054 (2013.01); G06K 2209/01 (2013.01)

(58) Field of Classification Search
CPC ............. G06K 9/03; G06K 9/18; G06K 9/72; G06K 9/2054; G06K 2209/01; G06K 9/6277; G06F 3/04883
USPC ......................................... 382/185, 187, 310
See application file for complete search history.

(56) References Cited

U.S. PATENT DOCUMENTS

| | | | | | |
|---|---|---|---|---|---|
| 5,680,478 | A | * | 10/1997 | Wang | G06K 9/00456 382/171 |
| 5,748,807 | A | * | 5/1998 | Lopresti | G06K 9/03 382/310 |
| 7,013,045 | B2 | * | 3/2006 | Sommer | G06K 9/726 382/181 |
| 7,327,883 | B2 | * | 2/2008 | Polonowski | G06K 9/6272 382/182 |
| 7,499,588 | B2 | * | 3/2009 | Jacobs | G06K 9/00463 382/173 |
| 8,726,148 | B1 | * | 5/2014 | Battilana | G06F 17/273 715/234 |

(Continued)

OTHER PUBLICATIONS

Reynaert, M., *Text-Induced Spelling Correction*, Tilburg University, The Netherlands (Dec. 2, 2005) 32 pages.

(Continued)

*Primary Examiner* — Kanjibhai Patel
(74) *Attorney, Agent, or Firm* — Alston & Bird LLP

(57) ABSTRACT

Embodiments of the present invention provide concepts for correcting optical character recognition (OCR) errors from and OCR scan result by sequentially applying an anagram hash (AH) and Levenshtein-Distance (LD) measurement for concurrent character identity-based (machine code) and character shape-based (OCR-Key) corrections. The OCR-Key classifies characters by shape into one or more disjoint and overlapping classes. Similar shaped-based classes appearing in consecutive characters are appended to a cardinality term, a repetition count of the class. The LD measurement groups OCR-Keys and differentiates on both class and cardinality to arrive at a shape-based mismatch error between competing candidate words from an associated dictionary and a target word from the OCR scan. The shape-based LD measurement errors are then functionally merged with the character identity-based deletion, substitution, and insertion errors to find a minimum error for the set of candidate words, corresponding to the preferred candidate word match to the target word.

39 Claims, 8 Drawing Sheets

(56) References Cited

U.S. PATENT DOCUMENTS 8,755,604 B1* 6/2014 Gross .................. G06K 9/72
382/181
2012/0130706 A1 5/2012 Qiu

OTHER PUBLICATIONS

Niklas, K., *Unsupervised Post-Correction of OCR Errors*, Diploma Thesis, Leibniz Universität Hannover (Jun. 11, 2010), 102 pages.
Levenshtein distance [online] [retrieved Aug. 22, 2014]. Retrieved from the Internet: <URL: http://en.wikipedia.org/wiki/Levenshtein_distance>. (dated Aug. 21, 2014) 8 pages.
Ahlberg, Malin, et al, "A Best-First Anagram Hashing Filter for Approximate String Matching With Generalized Edit Distance", *Proceedings of the 24th International Conference on Computational Linguistics COLING*, Dec. 8-15, 2012, pp. 13-22, India.
International Searching Authority, International Search Report and Written Opinion for International Application No. PCT/US2015/041110, Nov. 11, 2015, 6 pages, European Patent Office, The Netherlands.
Reynaert, Martin W. C., "Character Confusion Versus Focus Word-Based Correction of Spelling and OCR Variants in Corpora", *International Journal of Document Analysis and Recognition (IJDAR)*, Nov. 3, 2010, pp. 173-187, vol. 14, No. 2, Springer, Germany.
Reynaert, Martin, "Non-Interactive OCR Post-Correction for Giga-Scale Digitization Projects", *Computational Linguistics and Intelligent Text Processing* (Lecture Notes in Computer Science), Feb. 18, 2007, pp. 617-630, Springer, Germany.
Tahmasebi, Nina, et al, "On the Applicability of Word Sense Discrimination on 201 Years of Modern English", *International Journal on Digital Libraries*, Mar. 16, 2013, pp. 135-153, vol. 13, No. 3-4, Springer, Germany.

* cited by examiner

| candidate word | LD | | | | LD/OCR | | | |
|---|---|---|---|---|---|---|---|---|
| | delete | insert | substitute | total | delete | insert | substitute | total (ix) |
| irrigation | 0 | 1 | 1 | 2 | 0 | 0 | 0 | 0 (i0) |
| immigration | 0 | 1 | 1 | 2 | 0 | 0 | 1 | 1 (i3) |
| irritation | 0 | 1 | 2 | 3 | 0 | 0 | 1 | 1 (i0) |
| imitation | 0 | 0 | 1 | 1 | 0 | 0 | 1 | 1 (i0) |

| class | member | cardinality |
|---|---|---|
| i | f, I, j, k, l, r, t, B, D, E, F, I, J, K, L, P, R, T, 1, ! | 1 |
| i | n, h, u, H, N, U | 2 |
| i | m, M | 3 |
| o | a, b, d, g, o, p, q, O, Q, 6, 9, 0 | 1 |
| c | e, c, C, G | 1 |
| v | v, x, y, V, Y, X | 1 |
| v | w, W | 2 |
| s | s, S, 5 | 1 |
| z | z, Z | 1 |
| a | A | 1 |

TARGETED OPTICAL CHARACTER RECOGNITION (OCR) FOR MEDICAL TERMINOLOGY

FIELD

Embodiments discussed herein are related to the field of optical character recognition for medical terminology, and more particularly to provide for systems, methods, apparatuses, computer readable media, and other means for OCR post-processing for medical terminology that error corrects.

BACKGROUND

A number of deficiencies and problems associated with OCR techniques are specific to medical terminology, for example, particularly related to medical terminology databases which are not reliably repeatable, contextual, and not syntactically consistent, such that database queries, conversions and transformations are intractable. Through applied effort, ingenuity, and innovation, exemplary solutions to many of these identified problems are alleviated by embodiments of the present invention, which are described in detail below.

BRIEF SUMMARY

Systems, methods, apparatuses, and computer readable media are disclosed for providing an OCR correction and verification post-processing method for medical terminology that error corrects. The OCR correction and verification post-processing method merges two distinct character recognition techniques based on two distinct character features.

In accordance with one aspect of the present invention, a method is provided for a first character recognition technique based on the character identity, whereby the character identity may be a function of a machine code representation of the character. In some embodiments, the machine code representation of the character may be an American Standard Code for Information Interchange (ASCII), for example. In accordance with another aspect of the present invention, a method is provided for a second character recognition technique based on the character shape, whereby the character shape may be classified into one or more of multiple classifications that recognize both the character features of the shapes and the repeated elements of the shape.

In accordance with another aspect of the present invention, a method is provided for a merging of the two aforementioned character recognition techniques, that of character recognition by character identity and shape, whereby a weighted combination of the two techniques provides for an OCR correction and verification method superior to either technique applied independently. Such a merging of the two techniques—character identity and character shape—may be considered analogous to a two-dimensional signal processing technique functioning in the space and spatial frequency domain. That is, in a post-processor environment, the character identity may be analogous to a spatial signature, and the character shape classification—including shape repetitions—may be analogous to a spatial frequency analysis.

In accordance with yet another aspect of the present invention, a computer program product is provided for a first character recognition technique based on the character identity, whereby the character identity may be a function of a machine code representation of the character. In accordance with another aspect of the present invention, a computer program product is provided for a second character recognition technique based on the character shape, whereby the character shape may be classified into one or more of multiple classifications that recognize both the character features of the shapes and the repeated elements of the shape. In accordance with another aspect of the present invention, a computer program product is provided for a merging of the two aforementioned character recognition techniques, that of character recognition by character identity and shape, whereby a weighted combination of the two techniques provides for an OCR correction and verification method superior to either technique applied independently.

In accordance with yet another aspect of the present invention, an apparatus comprising at least one processor and at least one memory including computer program code is provided for a first character recognition technique based on the character identity, whereby the character identity may be a function of a machine code representation of the character. In accordance with another aspect of the present invention, an apparatus comprising at least one processor and at least one memory including computer program code is provided for a second character recognition technique based on the character shape, whereby the character shape may be classified into one or more of multiple classifications that recognize both the character features of the shapes and the repeated elements of the shape. In accordance with another aspect of the present invention, an apparatus comprising at least one processor and at least one memory including computer program code is provided for a merging of the two aforementioned character recognition techniques, that of character recognition by character identity and shape, whereby a weighted combination of the two techniques provides for an OCR correction and verification method superior to either technique applied independently.

Example embodiments described herein comprise methods for the correction and verification by an OCR post-processor of a machine code rendered by an OCR processor scan of an original document. The machine code may be an ASCII code, as previously mentioned, or more generally, the machine code may be an encoding associated with a portable document format (pdf). Further, the machine code may be that of the character represented by a vector graphics instruction set associated with the pdf file. The purpose of the post-processor of one embodiment of the present invention is to correct and verify the rendered machine code from the original OCR scan.

In other examples, it may be possible for the OCR post-processor of one embodiment of the present invention to provide for a character identity and shape matching learning function such that one or more of a machine code matching function, a character shape matching, and a dictionary arbitration function are update by a manual, semi-manual, or automatic feedback from the matching results. The details of such a feedback and update function associated with the OCR post-processing learning function is addressed in the following sections.

This patent application is directed to embodiments of the present invention focused on the correction and verification by a post-processing function of an OCR scan from an original text—possibly handwritten- to a machine encoded representation of a character. The post-processor effectively functions in two dimensions, merging a character identity correction and a character shape correction algorithm to provide for the correction and verification process of one embodiment of the present invention. The following descriptions provide for the functional operation of the post-processor functions, and include non-limiting examples to elucidate the embodiments provided.

SUMMARY

Embodiments of the present invention provides for a method for correcting optical character recognition (OCR) errors from an OCR scan result, comprising: registering an OCR machine code from the OCR scan result, mapping the registered OCR machine code to one or more of an OCR-Key according to one or more character shape functions, selecting—from a dictionary—a first set of candidate words as possible matches to the registered OCR machine code, selecting—from the dictionary—a second set of candidate words as possible matches to the OCR-Key, calculating a set of errors between the first and second set of candidate words and the OCR machine code and the OCR-Key, and selecting a preferred candidate word from the first and second set of candidate words with the smallest set of errors.

The registering the OCR machine code comprises recording a character identity. The mapping the registered OCR machine code comprises mapping to a set of character shape classes. The mapping comprises mapping from the entirety of an individual character. The mapping comprises mapping from one or more segments of an individual character. The mapping comprises mapping from a combination of one or more characters.

The set of character shape classes may comprise disjoint classes. The set of character shape classes may comprise overlapping classes. The set of character shape classes may comprise a repetition encoding of a characteristic shape, wherein the repetition encoding is designated as a cardinality of the character shape class. A set of consecutive characters in a common character shape class may be grouped into a single class, with a cardinality equal to the sum of the cardinalities of each of the consecutive characters.

The selecting a first set of candidate words comprises a character identity first anagram hash. The character identity first anagram hash (AH-I) comprises: mapping from the registered OCR machine code to an AH-I geometry, constructing an AH-I search tree in the AH-I geometry, and searching the AH-I search tree.

The AH-I geometry comprises: a unique point for each candidate word and its respective set of anagrams and orthogonal groups of candidate words and their set of respective anagrams, wherein the orthogonal groups differ from the registered OCR machine code by one or more of a character deletion, a character substitution, and a character insertion. The AH-I geometry may be generated by a polynomial function of order n, wherein n is greater than or equal to five. The AH-I geometry may be generated by a prime factors function.

The constructing an AH-I search tree comprises populating the AH-I geometry with the candidate words and their respective anagrams. The searching the AH-I search tree comprises: stepping through the AH-I geometry by incremental character deletions, substitutions, and insertions to the registered OCR machine code, and recording the candidate words and their anagrams from the search tree populating the AH-I geometry.

The selecting a second set of candidate words comprises a character shape second anagram hash, wherein the character shape second anagram hash (AH-S) comprises: mapping from the OCR-Key to an AH-S geometry, constructing an AH-S search tree in the AH-S geometry, and searching the AH-S search tree. The AH-S geometry comprises: a unique point for each candidate OCR-Key and its respective set of OCR-Key anagrams, and orthogonal groups of candidate OCR-Keys and their set of respective anagrams, wherein the orthogonal groups differ from the registered machine code OCR-Key by one or more of a character shape class deletion, a character shape class substitution, and a character shape class insertion. The cardinality of a character shape class may vary with the unique points and the orthogonal groups.

The constructing an AH-S search tree comprises populating the AH-S geometry with the candidate word OCR-Keys and their respective anagrams. The searching the AH-S search tree comprises: stepping through the AH-S geometry by incremental character shape class deletions, substitutions, and insertions to the registered OCR machine code OCR-Key, and recording the candidate words and their anagrams from the search tree populating the AH-S geometry.

The AH-S geometry may be a hidden dimension of the AH-I geometry, wherein a point in the hidden dimension comprises one or more sets of consecutive characters within a common character shape class. (Please see the example in FIGS. 1A and 2A). The hidden dimension may have a cardinality equal to the sum of the cardinalities of the consecutive characters within the common character shape class.

The calculating/determining a set of errors between the first set of candidate words and the registered OCR machine code comprises a Levenshtein-Distance (LD) measure. The LD measure incorporates transpositions, effectively providing for a Danerau-Levenshtein-Distance (DLD) measure. The LD measure comprises an LD matrix or an LD trellis, wherein the LD trellis is traversed by from more than one path to all possible paths. The traversing of the LD trellis is step-by-step, wherein the traversing the LD trellis step-by-step includes a registering of an LD trellis step error at each step, and a sequential collection of LD trellis step errors comprises an LD critical path, whereby the critical path is a minimum error path.

The calculating a set of errors between the second set of candidate words and the registered OCR machine code OCR-Key comprises a Levenshtein-Distance (LD/OCR-Key) measure. The LD/OCR-Key measure comprises an LD/OCR-Key matrix or an LD/OCR-KEY trellis, wherein the LD/OCR-KEY trellis is traversed by from more than one path to all possible paths. The traversing is step-by-step, wherein the traversing the LD/OCR-KEY trellis step-by-step includes a registering of an LD/OCR-KEY trellis step error at each step, and a sequential collection of LD/OCR-KEY trellis step errors comprises an LD/OCR-KEY critical path, whereby the critical path is a minimum error path.

The LD critical path associated with the LD trellis and the LD/OCR-KEY critical path associated with the LD/OCR-KEY trellis may be constructed concurrently, wherein the smallest set of errors is a function of the LD and LD/OCR-KEY critical paths. The function comprises: the LD trellis step error associated with the last step in the LD critical path and the LD/OCR-KEY trellis step error associated with the last step in the LD/OCR-KEY critical path.

The function is applied to the first and second set of candidate words. The function further comprises a frequency of the respective first and second candidate words, wherein the frequency component of the function represents a candidate word entropy. A collection of candidate word entropies provides for a total entropy of the OCR scan.

The selecting a preferred candidate word comprises selecting a minimum error. The minimum error may include a repetition encoding of one or more character shape classes, wherein the repetition encoding is designated as a cardinality of the character shape class.

The minimum error may exclude a character shape class deletion, substitution, or insertion between dissimilar character shape classes, as the character shape class deletion, substitution, and insertion errors for dissimilar character shape classes effectively duplicate—or count twice—the previously registered OCR machine code character identity deletion, substitution, and insertion errors.

Further embodiments of the present invention provides for an apparatus for correcting optical character recognition (OCR) errors from an OCR scan result, said apparatus comprising a processing device and a memory-storing computer-executable instructions, the memory and the computer-executable instructions are further configured to, with the processing device, cause the apparatus to: register an OCR machine code from the OCR scan result, map the registered OCR machine code to one or more of an OCR-Key according to one or more character shape functions, select—from a dictionary—a first set of candidate words as possible matches to the registered OCR machine code, select—from the dictionary—a second set of candidate words as possible matches to the OCR-Key, calculate/determine a set of errors between the second set of candidate words and the OCR machine code and the OCR-Key, and select a preferred candidate word from the second set of candidate words with the smallest set of errors.

Further, the map of the registered OCR machine code to one or more of the OCR-Key according to one or more character shape functions comprises the memory and the computer-executable instructions are further configured to, with the processing device, cause the apparatus to: map from one or more segments of an individual character represented by the OCR machine code to one or more character shape classes, map from a combination of one or more characters represented by the OCR machine code to the one or more character shape classes, map according to a character shape function comprising a repetition encoding of a characteristic shape, wherein the repetition encoding is designated as a cardinality of the one or more character shape classes, map according to a character shape function, wherein a set of consecutive characters in a common character shape class are grouped into a single class with a cardinality equal to the sum of the cardinalities of each of the consecutive characters, and map to the set of character shape classes comprising disjoint classes, overlapping classes, and combinations thereof.

Further, the select a second set of candidate words comprises the memory and the computer-executable instructions are further configured to, with the processing device, cause the apparatus to activate a character shape anagram hash (AH-S), comprising: a map from the OCR-Key to an AH-S geometry, a construction of an AH-S search tree in the AH-S geometry, and a search of the AH-S search tree.

The map to the AH-S geometry further comprises: a map to a unique point for each candidate OCR-Key and its respective set of OCR-Key anagrams, a map to orthogonal groups of candidate OCR-Keys and their set of respective anagrams, wherein the orthogonal groups differ from the registered machine code OCR-Key by one or more of a character shape class deletion, a character shape class substitution, and a character shape class insertion, and the aforementioned cardinality, wherein the cardinality of a character shape class may vary with the unique points and the orthogonal groups.

Calculate/determine a set of errors between the second set of candidate words and the registered OCR machine code and the OCR-Key comprises the memory and the computer-executable instructions are further configured to, with the processing device, cause the apparatus to: calculate/determine a first Levenshtein-Distance (LD) measure between the second set of candidate words and the registered OCR machine code, and calculate/determine a second Levenshtein-Distance (LD/OCR-Key) measure between the second set of candidate words and the OCR-Key. The calculation/determination of the LD measure and the LD/OCR-Key measure comprises at least one of an LD matrix or LD trellis and at least one of an LD/OCR-Key matrix or LD/OCR-Key trellis.

The LD and LD/OCR-Key trellises are traversed by from more than one path to all possible paths, wherein the traversing the LD and the LD/OCR-Key trellises comprises a step-by-step registering of an LD and an LD/OCR-Key trellis step error at each step. Further, a sequential collection of LD and LD/OCR-Key trellis step errors comprises an LD and an LD/OCR-Key critical path, wherein the critical path is a minimum error path.

In one embodiment, the LD and the LD/OCR-Key critical paths associated with the LD trellis and the LD/OCR-Key trellis are constructed concurrently. In one embodiment, the smallest set of errors is a function of the LD and LD/OCR-Key critical paths. In some embodiments, the function itself comprises the memory and the computer-executable instructions are further configured to, with the processing device, cause the apparatus to: calculate/determine the smallest set of errors based on an LD trellis step error associated with the last step in the LD critical path, and calculate/determine the smallest set of errors based on an LD/OCR-Key trellis step error associated with the last step in the LD/OCR-Key critical path.

In some embodiments, the function is applied to the second set of candidate words. In some embodiments, the function further comprises the memory and the computer-executable instructions are further configured to, with the processing device, cause the apparatus to: calculate/determine differences from the registered machine code OCR-Key by one or more of a character shape class deletion, a character shape class substitution, and a character shape class insertion, and calculate/determine differences from the registered machine code OCR-Key in the cardinality of the character shape class. In some embodiments, the function further comprises a frequency of the respective second set of candidate words.

Further embodiments of the present invention provides for a non-transitory computer-readable medium storing machine-readable program code for causing, when executed, one or more devices to perform the following functions for correcting optical character recognition (OCR) errors from an OCR scan result: register an OCR machine code from the OCR scan result, map the registered OCR machine code to one or more of an OCR-Key according to one or more character shape functions, select—from a dictionary—a first set of candidate words as possible matches to the registered OCR machine code, select—from the dictionary—a second set of candidate words as possible matches to the OCR-Key, calculate/determine a set of errors between the second set of candidate words and the OCR machine code and the OCR-Key, and select a preferred candidate word from the second set of candidate words with the smallest set of errors.

Further, the map the registered OCR machine code to one or more of the OCR-Key according to one or more character shape functions comprises causing, when executed, one or more devices to perform the following functions: map from one or more segments of an individual character represented by the OCR machine code to one or more character shape classes, map from a combination of one or more characters represented by the OCR machine code to the one or more character shape classes, map according to a character shape function comprising a repetition encoding of a characteristic shape, wherein the repetition encoding is designated as a cardinality of the one or more character shape classes, map according to a character shape function, wherein a set of consecutive characters in a common character shape class are grouped into a single class with a cardinality equal to the sum of the cardinalities of each of the consecutive characters, and map to the set of character shape classes comprising disjoint classes, overlapping classes, and combinations thereof.

Further, the select a second set of candidate words comprises causing, when executed, one or more devices to activate a character shape anagram hash (AH-S), comprising: a map from the OCR-Key to an AH-S geometry, a construction of an AH-S search tree in the AH-S geometry, and a search of the AH-S search tree.

The map to the AH-S geometry further comprises causing, when executed, one or more devices to perform the following functions: a map to a unique point for each candidate OCR-Key and its respective set of OCR-Key anagrams, a map to orthogonal groups of candidate OCR-Keys and their set of respective anagrams, wherein the orthogonal groups differ from the registered machine code OCR-Key by one or more of a character shape class deletion, a character shape class substitution, and a character shape class insertion, and a registration of the aforementioned cardinality, wherein the cardinality of a character shape class may vary with the unique points and the orthogonal groups.

To calculate/determine a set of errors between the second set of candidate words and the registered OCR machine code and the OCR-Key comprises causing, when executed, one or more devices to perform the following functions: calculate/determine a first Levenshtein-Distance (LD) measure between the second set of candidate words and the registered OCR machine code, and calculate/determine a second Levenshtein-Distance (LD/OCR-Key) measure between the second set of candidate words and the OCR-Key. The calculation/determination of the LD measure and the LD/OCR-Key measure comprises at least one of an LD matrix or LD trellis and at least one of an LD/OCR-Key matrix or LD/OCR-Key trellis.

The LD and LD/OCR-Key trellises are traversed by from more than one path to all possible paths, wherein the traversing the LD and the LD/OCR-Key trellises comprises a step-by-step registering of an LD and an LD/OCR-Key trellis step error at each step. Further, a sequential collection of LD and LD/OCR-Key trellis step errors comprises an LD and an LD/OCR-Key critical path, wherein the critical path is a minimum error path.

In one embodiment, the LD and the LD/OCR-Key critical paths associated with the LD trellis and the LD/OCR-Key trellis are constructed concurrently. In one embodiment, the smallest set of errors is a function of the LD and LD/OCR-Key critical paths. In some embodiments, the function itself comprises causing, when executed, one or more devices to perform the following functions: calculate/determine the smallest set of errors based on an LD trellis step error associated with the last step in the LD critical path, and calculate/determine the smallest set of errors based on an LD/OCR-Key trellis step error associated with the last step in the LD/OCR-Key critical path.

In some embodiments, the function is applied to the second set of candidate words. In some embodiments, the function further comprises causing, when executed, one or more devices to perform the following functions: calculate/determine differences from the registered machine code OCR-Key by one or more of a character shape class deletion, a character shape class substitution, and a character shape class insertion, and calculate/determine differences from the registered machine code OCR-Key in the cardinality of the character shape class. In some embodiments, the function further comprises a frequency of the respective second set of candidate words.

BRIEF DESCRIPTION OF THE SEVERAL VIEWS OF THE DRAWINGS

Figure 1A:
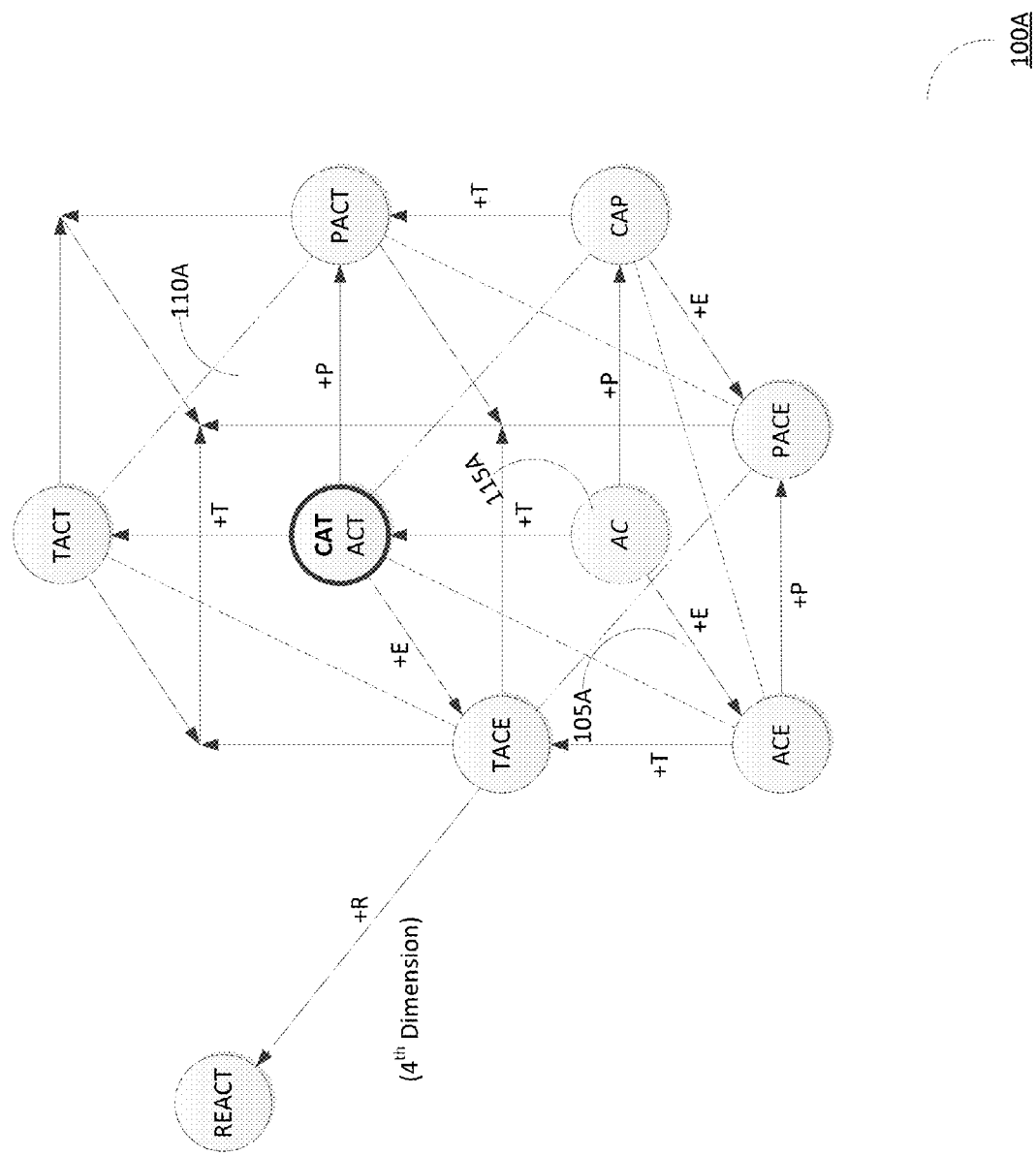
Figure 1B:
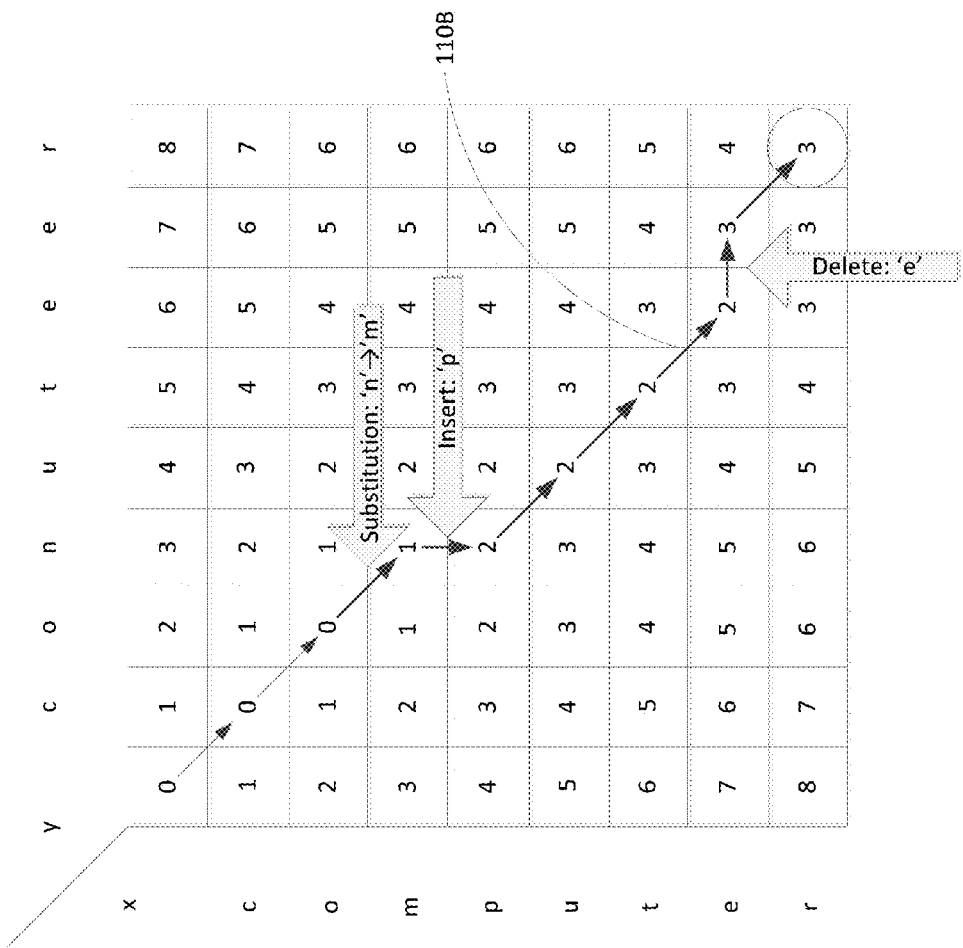
Figure 2A:
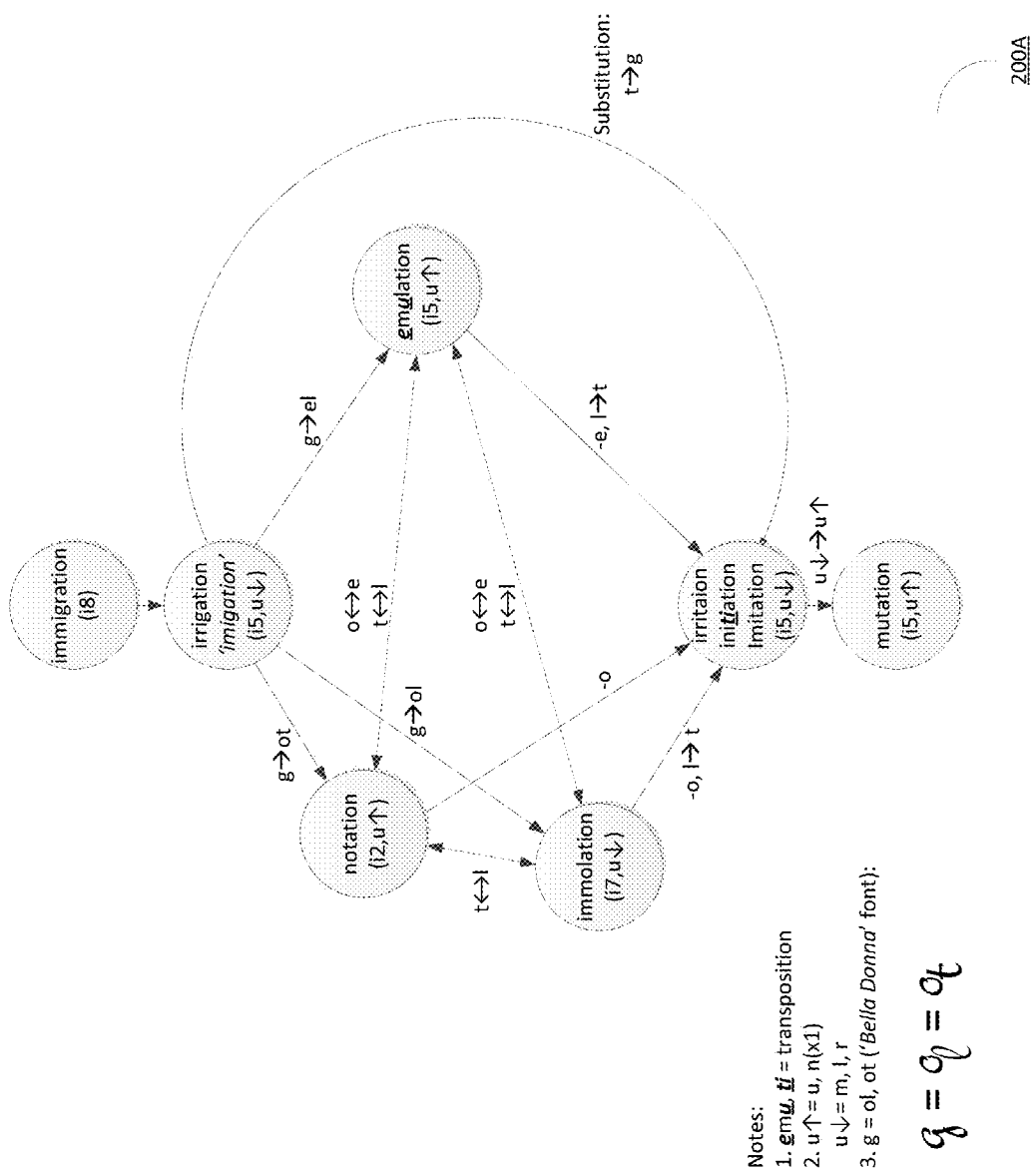
Figure 2B:
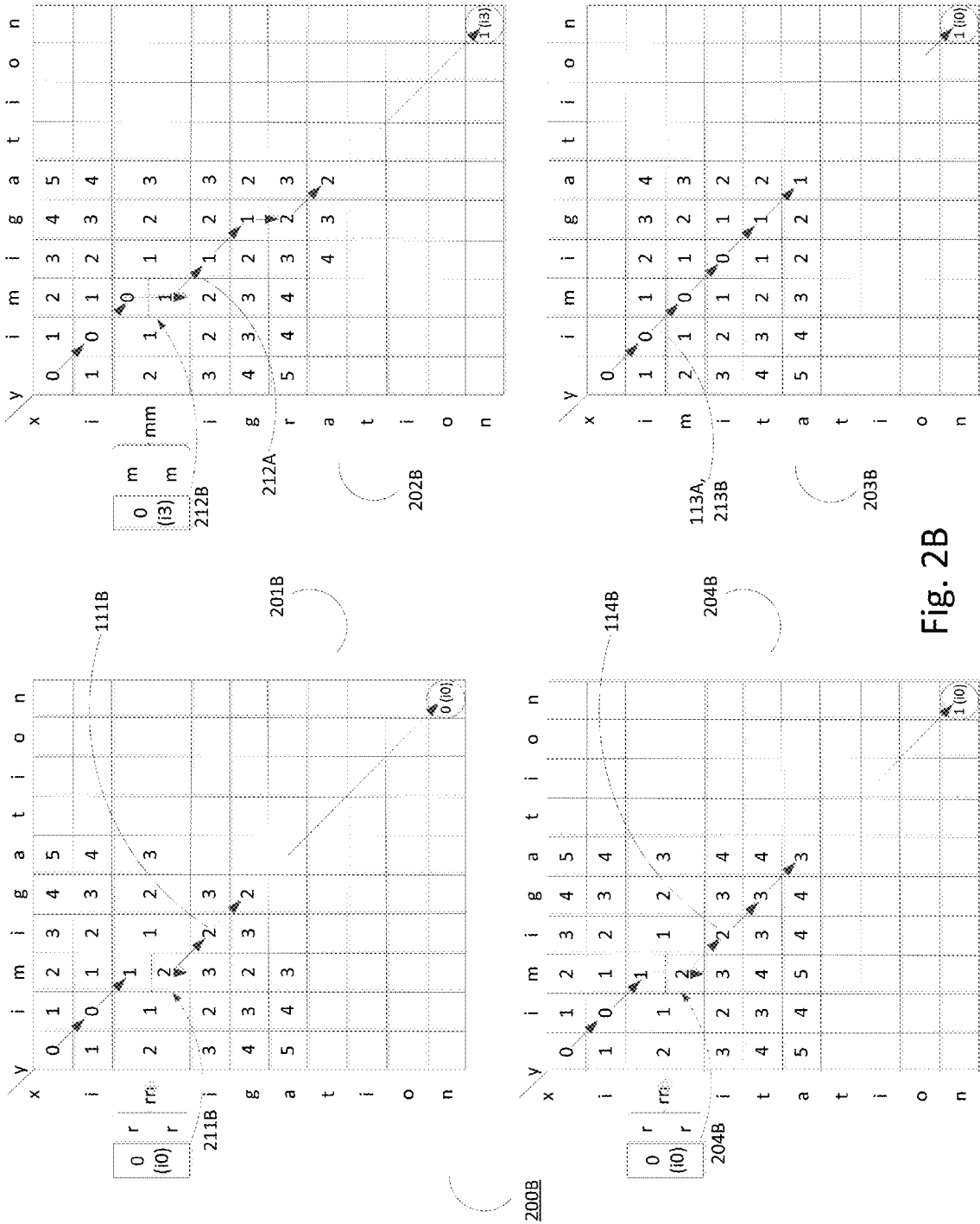
Figure 4A:
Figure 4B:
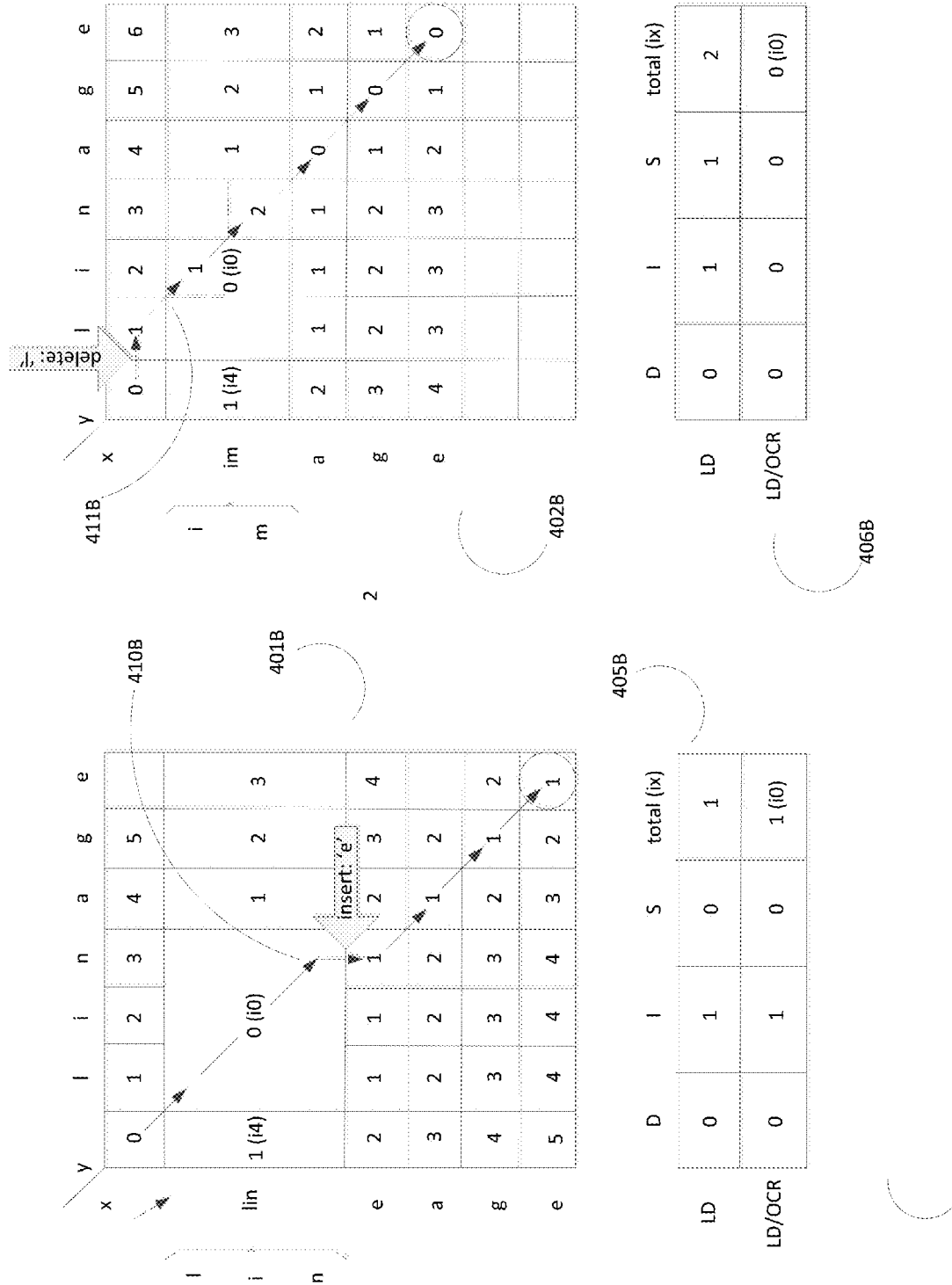
Figure 5:

Having thus described embodiments of the invention in general terms, reference will now be made to the accompanying drawings, which are not necessarily drawn to scale, and wherein:

FIG. 1A illustrates an Anagram Hash (AH) function for an OCR post-processing method based on a character identity associated with a machine encoding by an original OCR scan, in accordance with example embodiments of the present invention;

FIG. 1B illustrates a Levenshtein-Distance (LD) measurement for the results of an AH function based on a character identity, as may be expected from AH results as described in FIG. 1A, in accordance with example embodiments of the present invention;

FIG. 2A illustrates an AH function for an OCR post-processing method based on a character shape associated with an original OCR scan, in accordance with example embodiments of the present invention;

FIG. 2B illustrates an LD measurement for the results of the AH function based on a character shape, as may be expected from AH results as described in FIG. 2A, in accordance with example embodiments of the present invention;

FIG. 3 illustrates an LD measurement summary for character identity-based LD measurements and character shape-based LD measurements, for the first of four candidate words extracted by an AH function from the associated dictionary, from FIG. 2B, in accordance with example embodiments of the present invention;

FIG. 4A illustrates a first superimposed character identity-based LD measurement and a character shape-based LD measurement, and a tabulated summary table, for an example candidate word set extracted by an AH function from the associated dictionary, in accordance with example embodiments of the present invention;

FIG. 4B illustrates a second superimposed character identity-based LD measurement and a character shape-based LD measurement, and a tabulated summary table, for an example candidate word set extracted by an AH function from the associated dictionary, in accordance with example embodiments of the present invention; and FIG. 5 illustrates an example character identity-based code to character shape-based code mapping, including character shape repetition count—or cardinality, in accordance with example embodiments of the present invention.

DESCRIPTION

Example embodiments of the present invention now may be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms 'illustrative,' 'example,' and 'exemplary' are used to be examples with no indication of quality level. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As should be appreciated, the apparatus, systems, computing devices, computing entities, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, processing elements, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the entities may include one or more communications interfaces for communicating with various computing entities, such as by communicating data, content, information, and/or similar terms used herein interchangeably that can be transmitted, received, operated on, processed, displayed, stored, and/or the like.

In one embodiment, the entities may include or be in communication with one or more processing elements/devices (also referred to as processors, processing circuitry, and/or similar terms used herein interchangeably) that communicate with other elements via a bus, for example. As will be understood, the processing element may be embodied in a number of different ways. For example, the processing element may be embodied as one or more complex programmable logic devices (CPLDs), microprocessors, multi-core processors, co-processing entities, application-specific instruction-set processors (ASIPs), microcontrollers, and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly.

In one embodiment, the entities may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like.

In one embodiment, the entities may further include or be in communication with volatile media (also referred to as volatile storage, memory, memory storage, memory circuitry and/or similar terms used herein interchangeably). In one embodiment, the volatile storage or memory may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the entities.

As indicated, in one embodiment, the entities may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the entities may include or be in communication with one or more input elements, such as a keyboard input, a mouse input, a touch screen/display input, motion input, movement input, audio input, pointing device input, joystick input, keypad input, and/or the like. The entities may also include or be in communication with one or more output elements (not shown), such as audio output, video output, screen/display output, motion output, movement output, and/or the like.

As will be appreciated, one or more of each entity's components may be located remotely from other components, such as in a distributed system. Furthermore, one or more of the components may be combined and additional components performing functions described herein may be included. Thus, the entities can be adapted to accommodate a variety of needs and circumstances. As will be recognized, these architectures and descriptions are provided for exemplary purposes only and are not limiting to the various embodiments.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

OCR Mapping Background and Functional Concepts

Embodiments of the present invention provides for an OCR correction and verification post-processing method. The method comprises the following steps: (1) an anagram hash (AH) that provides for a candidate word (cj) search and a first matching function to a target word (w), (2) an OCR-Key second matching function, and (3) a third function to merge the first two functions to provide for a proposed word (c*), the candidate word cj with the highest probability of matching the target word. The following sections and associated FIGS. provide a detailed description of the OCR correction and verification post-processing method.

FIG. 1A provides for a graphical representation of an example AH function associated with the first step in the OCR correction and verification post-processing method. FIG. 1A provides for the AH candidate word cj search 100A; the search proceeds through an AH tree for candidate words cj—and associated anagrams- to match a target word w.

More precisely, FIG. 1A provides for the AH word search 100A that extracts candidate words from a continually updated dictionary of candidate words. The candidate words may be restricted to the set of anagrams of the target word or character string and an additional set of anagrams of the target word or character string constructed with a predetermined number of deletion, insertion, and substitution errors. FIG. 1B then performs a direct comparison of each of the candidate words extracted from the dictionary with the target word to find the first match as a function of the number of deletion, insertion, and substitution errors. The first matching function 100B provided for in the present invention, shown graphically in FIG. 1B, is the Levenshtein-Distance (LD) measure.

FIG. 1A illustrates graphically the AH function 100A. In the example given in FIG. 1A, the target word w='cat' is shown in bold, with corresponding anagram 'act' appearing in the same bold circle. In general, there are $w_L!/k_1! k_2! \ldots k_i!$ total anagrams in an AH function for a target word $w_L$ characters long with a set of $c^i_k$ characters, whereby the $i^{th}$ character is repeated k times. For the given example—that is, the target word w='cat'—there are potentially six anagrams, including the target word, or 3!/1! 1! 1!=6.

Additionally, the AH function of the present embodiment may provide for candidate words cj—and anagrams of candidate words cj—whereby a single deletion, substitution, or insertion is made to the target word 'cat' to form the new candidate word AH subset. FIG. 1A graphically represents a possible search tree and indexing for candidate words cj and their respective anagrams.

Firstly, FIG. 1A presents a single deletion candidate word cj='AC'—the abbreviation for 'alternating current'—italicized in the given example to distinguish it as an abbreviation. In the search tree presented for the AH function in FIG. 1A, the candidate word cj='AC' resides at the origin of the tree. Each of the three major branches, as shown in FIG. 1A, represents displacements in the three Cartesian axes x, y, and z; specifically, for the given example, displacements in the x-axis correspond to a single insertion of the character 'E,' displacements in the y-axis correspond to a single insertion of the character 'P,' and displacements in the z-axis correspond to a single insertion of the character 'T.' The aforementioned single character insertions are represented in FIG. 1A by the labels '+E,' '+P,' and '+T.'

Respective displacements from the two-character abbreviation 'AC,' the origin of the AH search tree, provide for single character substitution candidate words cj='ace,' 'cap,' and 'cat'/'act,' whereby the anagrams 'cat' and 'act,' as previously described, also represent the target word w='cat' and its anagram 'act.' The single character substitution candidate words cj and their respective anagrams reside in the same plane, the (111) plane 105A, defined by the dashed lines connecting the respective single character substitution candidate words cj='ace,' 'cap,' and 'cat'/'act.'

Additionally, a subset of single character insertion candidate words cj may be generated directly from the subset of single character substitution words, previously generated by a single character insertion of the respective characters 'E,' 'P,' and 'T.' FIG. 1A shows four resulting single character insertion candidate words cj from such a subset of single character substitutions, the subset consisting of the single character insertion candidate words: 'tace,' 'tact,' 'pact,' and 'pace.' The subset comprised of the four single character insertion candidate words reside in a plane parallel to the previously generated single character substitution candidate word subset, defined by the (111) plane 110A, as determined by the dashed lines connecting the respective single character insertion candidate words cj='tace,' 'tact,' 'pact,' and 'pace.'

The construction of the AH function search tree is such that single character substitutions and single character insertions provide for subsets of candidate words on distinct, parallel planes, with anagrams of candidate words sharing vertices. Further, an AH function constructed in accordance with FIG. 1A may allow for possible variations to make corrections to a target word—in this example, the target word w='cat'—by providing for transpositions, insertions, deletions, and substitutions to the target word, whereby the transpositions, the anagrams, are inherent in the AH function itself. By constructing an AH function thusly, the LD to be calculated/determined in the next step—shown in FIG. 1B—may be considered a hybrid LD, or a Danerau-Levenshtein-Distance (DLD), which additionally considers the transposition of adjacent characters. The DLD effectively provides for a subset of the AH function 100A depicted graphically in FIG. 1A, whereby dash-lined arrows represent multiple transpositions of characters—that is, anagrams.

The AH function search tree, in this example, provides for a subset of single character substitution candidate words, defined by the (111) plane 105A, to be constructed parallel, distinct, and disjoint from a subset of single character insertion candidate words, defined by the (111) plane 110A. That is, single character substitution and insertion candidate words reside on parallel planes 105A and 110A in the three-dimensional (3D) construct (+E, +P, +T). Further, it may be interpreted that the single character deletion candidate abbreviation cj='AC' resides on yet a third distinct, disjoint, parallel (111) plane 115A, equally spaced with respect to the aforementioned 105A and 110A planes.

The example 3D (+E, +P, +T) AH function provides for the advantages of two-dimensional (2D) indexing of single character deletions, substitution, and insertion candidate words and their respective anagrams; that is, their respective transpositions.

FIG. 1A also illustrates a possible second character insertion candidate word cj='react,' by providing a fourth dimension (4D) for the AH search tree construction, that of '+R.' The second character insertion candidate word cj='react' may be a member of a subset of second character insertion candidate words resulting from a single character insertion performed on the single character insertion candidate word cj='tace.' As such, the full subset of single character insertions, that of insertions spanning the 4D space defined by the single character insertions of '+E,' '+P,' '+T,' and '+R,' now define a distinct, disjoint, 3D cube in the 4D search space, indexed in this case by the single character insertion candidate word cj='tace,' the emanation point.

Further, additional dimensions—one dimension for each character, for example—may be added to the AH search tree illustrated in FIG. 1A. For example, a 26-letter alphabet such as the English alphabet, would be represented by a 26-dimension (26D) AH search tree construct. Generalizations from the previous constructs follow; that is, character deletions, substitutions, and insertions each index a distinct, disjoint multi-dimensional geometry, whereby each and every vertex—as with the example vertex 'cat'/'act'—provides for the complete set of anagrams or transpositions associated with the indexed character string.

A multi-dimensional character identity-based construct, as shown in FIG. 1A, may be used directly as a dictionary selection tool for an associated, updatable dictionary that works in conjunction with the AH search tree construct. As an alternative embodiment, the multi-dimensional character identity-based construct, shown in FIG. 1A, specifically the requisite orthogonality component associated with such a construct or geometry, may be approximated by a functional. That is, dictionary selection of candidate words cj, in accordance with the AH function 100A, is dependent on an AH numerical functional both generating a numerical value unique to each word and its complete set of anagrams, and a distance measure between two unique sets of anagrams indicative of the error between the two associated words. Further, dictionary selection may be made in accordance with a state machine that steps through the composition characters of the target word w step-by-step—or state-to-state—in the process of winnowing the dictionary to the target word w and associated anagrams that share the numerical functional value.

For example, it may be possible to define an AH functional by the following:

$$\text{hash}(w) = \Sigma_{j=1}^{w_L} \text{int}(c_j)^n; \text{ for: } w = c_1 c_2 \ldots c_{w_L}, n=5 \quad (1A.1)$$

Whereby, the 'int(cj)' function represents a mapping from a character to its corresponding 'ISO Latin Code' numerical value—an integer. The arbitrary, empirical order of n=5 provides for a unique numerical representation for each set of anagrams of the given target word w, with word length $w_L$. Further, any and all anagrams of insertions, deletions, and substitutions to the target word w, as presented by the AH function 100A depicted in FIG. 1A, present the same numerical differences in the AH functional. The minimal differences between the AH functional for the target word w and a candidate word cj uniquely determines the character differences. As such, by limiting the numerical differences between target and candidate words, the number of insertion, deletion, and substitution errors is equally limited, thus restricting the dictionary search field.

The number of insertion, deletion, and substitution errors may be subjected to a hard, fixed limit—for example, the number of errors may be limited to two. Or, the number of allowable, correctable insertion, deletion, and substitution errors may be limited dynamically, as a function of the legibility of the associated document originally scanned. Further, numerical differences between the AH functionals for the target word w and the candidate words cj may be related to the indigenous characters associated with the AH function 100A.

The AH functional provided for in Equation 1A.1 is empirical, and not singular. It is likely that any AH functional of similar form, with n>5, provides for similarly unique numerical values for candidate words and their respective anagrams. The AH functional in Equation 1A.1 is computationally fast and efficient.

An alternative AH functional may be constructed in accordance with the following equation:

$$\text{hash}(w) = \Pi_{j=1}^{w_L} \text{prime}(c_j) \text{ for: } w = c_1 c_2 \ldots c_{w_L} \quad (1A.2)$$

Whereby, the 'prime(cj)' function represents a mapping from a character to a corresponding prime number. As such, the AH functional presented in Equation 1A.2 is guaranteed to provide a unique numerical value for each and every character string and its respective subset of anagrams, as the character mappings components 'prime(cj)' now effectively represent the prime factors for the corresponding character string. An AH functional such as that presented in Equation 1A.2 is therefore orthogonal, and constitutes a rendition of the geometrical model presented in FIG. 1A. One disadvantage to the AH functional presented in Equation 1A.2, a functional based on prime factors, is its relative computational inefficiency with respect to the AH function of Equation 1A.1, particularly with longer character strings.

Two examples provide insight into character-based AH functional distance analysis. The first example is directed to typographical errors. The rationale is that substitution errors may be related to typographical errors, in which the typographical errors may be highly correlated to the layout of a 'querty' keypad, for example. As such, numerical distance errors associated with the AH functional may be correlated to physical proximities between keypad entry elements.

A second example may be directed to a correction of a noisy—or partially illegible—scan associated with the OCR function. As such, the character recognition itself is disrupted, and the errors associated with possible character insertions, deletions, and substitutions that result from a compromised OCR scan and function are now correlated with character shape. In fact, it is the recognition of the signatures of OCR errors associated with character shapes, and the resulting post-processing steps that allow for the corrections of such errors, that provides for the inventive step of embodiments of the present invention—that is, OCR-Keying.

Each of the previous examples, that of winnowing a candidate word cj search from the dictionary with the AH function by character and shape discrimination are implemented in the OCR correction and verification method of embodiments of the present invention. FIG. 1A illustrates the AH character discrimination; FIG. 2A, described in the next section, illustrates the AH shape discrimination. FIGS. 1B and 2B present the respective distance measurements with respect to the target word w for each of the candidate words cj associated with the AH results.

FIG. 1B provides for the first matching function 100B. FIG. 1B illustrates a graphical representation of the aforementioned Levenshtein-Distance (LD) measurement for character matching AH candidate words cj with the target word w. The example presented in FIG. 1B performs an LD measurement between the candidate word cj='computer' and the target character string—or target word—w='comuteer.' The LD measurement is made by a step-wise process; step-by-step constructing an LD matrix or trellis 100B. The LD matrix 100B is constructed explicitly by the following recursive algorithm, starting in the upper-left-hand corner of the LD matrix 100B and propagating essentially diagonally across the matrix to the lower-right:

$$D_{0,0} = 0 \quad (1B)$$
$$D_{i,0} = D_{i-1,0} + \text{cost}(x_i, -); \ 1 \le i \le n$$
$$D_{0,j} = D_{0,j-1} + \text{cost}(-, y_j); \ 1 \le j \le m$$
$$D_{i,j} = \min \begin{cases} D_{i-1,j} + \text{cost}(x_i, -) \\ D_{i,j-1} + \text{cost}(-, y_j) \\ D_{i-1,j-1} + \text{cost}(x_i, y_j) \end{cases}$$

where:

-continued $$\text{cost}(x_i, y_j) = \begin{cases} 0; & \text{if: } x_i = y_j \\ 1; & \text{else} \end{cases}$$

In this example, as previously stated, x='computer' and y='comuteer.' The dimensions of the LD matrix 100B are determined by the string lengths x='$x_0 x_1 \ldots x_n$' and y='$y_0 y_1 \ldots y_m$,' or (n+1)×(m+1) for strings of length n and m; in this example, the LD matrix 100B dimension is 9×9. More instructive, a graphical description and interpretation of the minimization function is presented in Equation 2. The minimization function given in Equation 1B provides for trellis-like unit steps through the LD matrix 100B. Each step may be directed to the right, down, or diagonally, a function of the (x,y) string match. A step to the right may represent a deletion from the y='comuteer' character string, in this example. A step down may represent a deletion from the x='computer' character string, in this example. Alternately, a step to the right and a step down may represent an insertion in the x='computer' and y='comuteer' character strings, respectively, in this example. A diagonal step may represent no misalignment in character strings (x,y); that is, no deletions nor insertions for character strings (x,y).

The 'cost' function in Equation 1B accumulates character mismatches, one-by-one. A critical path 105B through the LD matrix 100B—or trellis—follows the minimal cost function from the upper-left-hand corner to the lower-right. For the critical path: (1) steps to the right represent deletions to the y='comuteer' character string, (2) steps down represent insertions to the y='comuteer' character string, and (3) diagonal steps represent substitutions to the y='comuteer' character string, or a match to the x='computer' character string, the candidate word from the dictionary.

The y='comuteer' character string represents the target word w resulting from the OCR scan of the original document to be transcribed. The LD matrix 100B elements $D_{i,j}$ along the critical path 110B of the trellis provide for the cumulative deletions, insertions, and substitutions required to match the target word w to the candidate word cj, in this case the candidate word x='computer,' from the dictionary. The minimum value at the bottom or right-most edge of the LD matrix 100B, at the termination of the critical path 105B, represents the total number of deletion, insertion, and substitution errors between the target word w and the candidate word cj.

The LD measurement found in FIG. 1B, taken in conjunction with the AH function from FIG. 1A, effectively searches and scores the dictionary for all matches and variants in transposition (anagrams), deletions, insertions, and substitutions. FIGS. 1A-B provides for a character-based matching function. In the next section, an analogous matching function will be described that accounts for matching the shape of the characters in competing character strings. The shape-matching search and scoring method, and the associated merging of the two distinct matching functions—that is, character matching as depicted in FIGS. 1A-B, and shape-matching, as to be presented in FIGS. 2A-B—is at the core of the OCR correction and verification post-processing method of the present invention.

OCR Mapping Methods and Implementation

FIG. 2A illustrates a graphical realization of a second Anagram Hash (AH) function, in this case performed as a function of character shape rather than explicit character identification, as was presented with regard to FIG. 1A. The character shape is codified by an OCR-Key, whereby each character in the set of possible character representations is grouped into a class or combination of classes based strictly on shape.

Motivation for a second AH function based on character shape harkens back to errors associated with the original OCR scan, the mapping from an original manuscript—possibly handwritten- to the .pdf OCR rendering, the format presented to the OCR correction method. To demonstrate the power of a second AH function and a second measurement function, to be presented explicitly in the FIGS. 2A-B, whereby the second AH and measurement functions are reliant on character shape rather than character identity, as presented in FIGS. 1A-B, the following example is presented as an introductory overview:

(1) Assume the original document—handwritten—is scanned by an OCR processor and rendered in an associated .pdf document.

(2) Assume the original handwritten document contains the word: 'irrigation.'

(3) Assume the character string rendered by the OCR processor into the associated .pdf document is the character string 'imigation,' not in the standard English-language lexicon. (Note: the rendered character string now represents the target word w='imigation,' to be matched by the candidate words cj, resident in the associated dynamically updated dictionary).

Now, according to the first AH function and LD measurement based on character identification, previously described with regard to FIGS. 1A-B, two competing candidate words cj, that of c1='irrigation' and c2='immigration' may measure equal or nearly equal values for an LD measure, as both candidate words c1='irrigaton' and c2='immigration' differ from the target word w='imigation' by an LD measure of two—that is, one substitution and one insertion. Further, a third word from the dictionary, candidate word c3='imitation' differs from the target word w='imigation' by an LD measurement of just one—a single substitution. As such, the first AH function and LD measurement incorrectly selects the candidate word c3='imitation' as the closest match to the target word w='imigation.' Furthermore, the first AH function and LD measurement cannot even reach a resolution between the two second place competing candidate words c1 and c2; whereby, c1='irrigation' represents the correct selection from the dictionary, and c2='immigration' represents an incorrect selection from the dictionary.

The first AH function and LD measurement makes the incorrect selection of candidate word c3='imitation,' which differs from the target word w='imigation' by a single substitution.

But now, the OCR correction and verification post-processor of one embodiment of the present invention, a post-processor reliant on the classification and classification repetition—the character cardinality (cc)—based on character shape rather than strictly a function of character identity, provides for the means to correct this particular family of errors and other related families. Specifically, the second AH function and LD measurement based on character shape may be applied to differentiate the two competing candidate words c1='irrigation' and c2='immigration' with respect to the target word w='imigation,' and further to discriminate between the target word w='imigation' and the candidate word c3='imitation,' the selected candidate word from the first AH and LD measurement functions, shown in FIGS. 1A-B.

A rendering of the target word w='imigation' and the originally scanned word 'irrigation' in a cursive hand-writing style provides insight. Particularly, the handwritten cursive 'rr' taken from the originally scanned word 'irrigation' may appear as 'μ,' which may easily be misconstrued by the OCR processor as an 'm.' That is, the misrepresentation of the originally scanned word, the mistake made by the OCR processor, is itself likely to be a function of character shape. Therefore, a systematic approach for a post-processing correction and verification of the originally scanned character string based on character shape may show promise.

More specifically, it may be possible in general to relate several distinct characters and combinations of characters by shape. As described previously, OCR scans may incorrectly identify and confuse cursive renderings of the respective character strings 'rr' and 'm.' Further, the single characters 'i,' 'u,' and 'n,' and the double character 'nn' may be confused by an OCR scan of cursive text. Each of the aforementioned characters may belong to the same class of characters, or to a combination of character classes, classified by shape.

In the given example, a sample set $\mathcal{C}_i$, and an accompanying subset $\mathcal{C}_u$, may be represented by the following character set:

$$\mathcal{C}_i = \{i:u,n;nn,m,rr\}$$

$$\mathcal{C}_u = \{u\uparrow, n\downarrow\} \quad (2A.1)$$

Each of the characters in the $\mathcal{C}_i$ character set is said to belong to the common character class 'i,' with a characteristic shape comprising at least one vertical line segment in the lower-half of the character (note: evident for 'rr' in a cursive handwriting). The number of vertical lines—the number of repetitions in the characteristic shape—is defined as the character cardinality (cc). In this example, the cardinality (cc) of the $\mathcal{C}_i$ character set is given by the following mapping:

$$'i' = \mathcal{C}_i(i1)$$

$$'u,' 'n' = \mathcal{C}_i(i2)$$

$$'nn,' 'm,' 'rr' = \mathcal{C}_i(i3) \quad (2A.2)$$

Further, with the class $\mathcal{C}_i$, characters 'u' and 'n' may be differentiated by subclass $\mathcal{C}_u$ distinctions u↑ and n←, whereby the elements of the $\mathcal{C}_i$ subclass—'u' and 'n'—both are classified as $\mathcal{C}_i(i2)$, but are distinguished by orientation; that is, the 'n' is essentially an upside-down 'u.'

Now, referring to FIG. 2A, the second AH function may group characters such that shape classes are grouped together, regardless of cardinality (cc), a possible artifact of the OCR scan of the original—possibly handwritten—document. Further, as shown in FIG. 2A, a second character shape classification category may additionally affect the second AH search constraint. Namely, FIG. 2A presents a character class category defined as follows:

$$\mathcal{C}_{g/ce,ft} = \{g:ol,ot,el\} \quad (2A.3)$$

$$'g,' 'ol,' 'ot,' 'el' = \mathcal{C}_{g/ce,ft}(g1) \quad (2A.4)$$

It can be appreciated that the character class $\mathcal{C}_{g/ce,ft}$, defined in Equations 2A.3-2A.4, are particularly similar looking when represented in the 'Bella Donna' font, as shown in FIG. 2A. As such, an example second AH search tree based on character shapes—as well as character identities—may be constructed to incorporate the character shape classes $\mathcal{C}_i$ and $\mathcal{C}_{g/ce,ft}$, and may be represented by the tetrahedron geometry shown in FIG. 2A.

Specifically, as demonstrated in FIG. 2A, nodes or vertices in the second AH search tree construct are no longer governed by character deletions, substitutions, and insertions, is with FIG. 1B, but rather by character-shape deletions, substitutions, and insertions. For example, as shown in FIG. 2A, a strict character substitution may connect the character string el='irrigation' to a fourth character string c4='irritation' by substituting the character 't' for the character 'g.' But, the richness, the structure of the example tetrahedron geometry of FIG. 2A, which provides for character shape relationships, is completely ignored and does not factor into the AH search tree of FIG. 1A.

Including the character shape as an element in the second AH search tree provides for the tetrahedron construct of FIG. 2A. The tetrahedron construct effectively provides for a hidden dimension to the second AH search tree. For example, the strict character identity substitution 'g'→'t,' resulting in a transition from candidate word 'irrigation' to 'irritation,' is shown in FIG. 2A by the outer loop circumventing the tetrahedron geometry. Hidden from the character identity-based AH search tree is the character shape classes $\mathcal{C}_i$ and $\mathcal{C}_{g/ce,ft}$, embodied in the tetrahedron. FIG. 2A presents the embodiment of the shape classes $\mathcal{C}_i$ and $\mathcal{C}_{g/ce,ft}$ implicitly and explicitly. That is, the tetrahedron construct provides for implicit $\mathcal{C}_i$ class and cardinality matching (e.g., (15), (i7)) at each node or vertex of the tetrahedron, and the tetrahedron construct provides explicit transitions between elements of the $\mathcal{C}_{g/ce,ft}$ class as transitions between nodes of the tetrahedron.

The advantages associated with a character shape-based AH search tree, as presented in FIG. 2A, include the transitions—or more accurately, the OCR scanning errors—that may be shape-dependent rather than character-dependent. The example in FIG. 2A demonstrates that successive, likely scanning errors of similarly shaped characters and combinations of characters may allow the AH search tree to skip from one end of the tetrahedron to the other, effectively offering a character identity transition ('g'→'t'), whereby such a transition may be unlikely in a strict character identity-based AH function due to the dissimilarity in character shapes. That is, the single character substitution 'g'→'t' may not necessarily be directed by a shape-matching hash, however, through the tetrahedron construct, is still reachable.

Further, advantages associated with a character shape-based AH search tree, as presented in FIG. 2A, include the allowed variation in cardinality in transitions between nodes or vertexes, in this case in a variation in cardinality associated with the $\mathcal{C}_i = \{i: u, n; nn, m, rr\}$ class. Including variation in cardinality increases a shape-based search over a field whereby shape misidentification likely occurs, providing for a greater number of possible—and likely—candidate words to be processed next by the second LD measurement function, to be presented in FIG. 2B.

This then demonstrates an example of the richness of the second AH search tree of FIG. 2A, a hashing function that not only incorporates character shape-based and character identity-based matching and transpositions, and the cardinality in the case of character shape matching, but also merges these disparate matching strategies, even providing for sub-dimensional matching, as shown by the character shape-based tetrahedron geometry subordinate to the character identity-based 3D construct from FIG. 1B.

The same principles evident in the second AH search tree, given in FIG. 2A, the principles of merging character identity-based matching and character shape-based matching, may now be equally applied to a second LD measurement. The second LD measurement takes advantage of the additional information contained in the character shape matching and associated cardinality (cc) and allows for the construction of an LD/OCR-KEY measurement to determine character identity and character shape matching errors.

The systematic method provided for by one embodiment of the present invention for character shape matching is a character shape classification and cardinality approach or method, based from a character shape keying system defined as an OCR-Key. The OCR-Key maps characters, based on character identity as found by the OCR processor from the original scan, onto a shape pattern match, whereby the mapping may decompose the character into one or a combination of classes for character types.

Further, as is common in written texts, several identical classes and class combinations may appear consecutively in target words. The enumeration of consecutive class elements in an OCR-Key classification is defined as the class cardinality (cc). The class cardinality is a critical element in the classification of character shape within target words in the OCR post-processor, as many of the errors made by the OCR processor in the original scan are related by cc.

FIGS. 2A-B are presented as a method to codify, in general, the results of the foregoing example, and specifically present the solution in tabular format in FIG. 3. FIGS. 2A-B and 3 illustrate graphically an example of a second AH and LD measurement function. Taken one at a time, FIG. 2A illustrates graphically an example of the second AH function for the OCR correction and verification post-processing function. As can be appreciated, the second AH function tracks the first AH function, from FIG. 1A, in both form and function. The critical difference is that now, for a character shape-based retrieval, matching, and measurement function, the characteristics for the target character string and candidate word strings are codified by character shape, rather than by character identity. As a first step, an OCR-Key is presented as a minimal coding schema, comprising a minimal set of distinct shape-based class elements, mapping character identity to character shape class. One example of a minimal OCR-Key is presented in FIG. 3. (It should be noted that the minimal OCR-Key presented later in FIG. 5 is one of the simplest example OCR-Keys, and not specific enough nor suitable for the examples presented in the body of this application).

FIG. 2B illustrates graphically an example of the second LD measurement function for the OCR correction and verification post-processing function. As with the second AH function shown in FIG. 2A, the second LD measurement function tracks the first LD function, from FIG. 1A, in both form and function. The critical difference is that, as with the second AH function, for a character shape-based retrieval, matching, and measurement function, the characteristics for the target character string and candidate word strings are codified by character shape, rather than by character identity. As with FIG. 1B, FIG. 2B graphically illustrates critical paths 211B-214B tracing a minimum error path through the corresponding LD/OCR matrix or trellis 201B-204B by the registration of character shape-based errors between target and candidate words. The errors associated with LD/OCR matrix 201B-204B entries are both class errors and mismatches in cardinality. The errors and error types are summarized in the table presented in FIG. 3.

By providing a second, complimentary strategy, a second LD-based measurement function, the correction and verification post-processing method of one embodiment of the present invention allows for quantification of a distance measure between the target word and the competing candidate word that effectively adds a second information source to the decision tree. The merging of both character identity and character shape information sources provides for a more sound retrieval and matching function than that of either one as a stand-alone information source. This is particularly true when addressing the scanning and OCR retrieval processing associated with handwritten documents.

As such, in FIG. 2B both an LD matrix, as shown in FIG. 1B, and an LD/OCR-Key matrix 201B-214B are shown superimposed for matching each of four competing candidate words c1-c4 to the target word w. In this example, the target word w='imigation,' and the four candidate words, as previously stated, are given as follows:

c1='irrigation'
c2='immigration'
c3='imitation'
c4='irritation'

The candidate word set c1-c4 is presented as a subset of results from the corresponding second AH character shape-based function. As presented previously in FIGS. 1A-B, the candidate word character string $x='x_0x_1 \ldots x_n'$ and the target word character string $y='y_0y_1 \ldots y_m'$ define the columns and rows, respectively, for both LD and LD/OCR-Key matrices.

(Note that the LD matrix or trellis, as described in FIG. 1B, are highlighted by the character-based x-column character string, unlabeled in the example matrices in FIG. 2B. The LD/OCR-Key matrices or trellises 201B-204B are overlaid on the respective LD matrices, whereby the combination of matrices retains its labeling from the LD/OCR-Key matrices 201B-204B. The critical paths for the character identity-based trellises, as shown in FIG. 1B, are given in solid arrows by labels 111B-114B. The critical paths for the character shape-based trellises 201B-204B are shown by dashed arrows and the alternate character shape blocks—to be inserted for the strict character machine code or identities—by labels 211B-214B.)

This presentation format may exclude some non-pertinent details associated with the two matrices, but the format has the distinct advantage of comparing competing strategies and measurement information, side-by-side accessible. The advantages of this format are made more clear by the examples given in FIG. 2B. For the candidate word c1='irrigation,' the critical path 111B for the character identity-based matching algorithm requires one insertion and one substitution of the target word w='imigation' to constitute the c1 character string. But, immediately clear from the superimposed matrices, the critical path 211B for the character shape-based algorithm requires no error corrections to the target character string 'i-rr-i-g-a-ti-o-n' to match the candidate character string c1 'i-m-i-g-a-ti-o-n,' as the 'rr' and 'm' character strings are functionally equal, as described previously.

The errors associated with the LD critical paths 111B-114B and the LD/OCR-Key critical paths 211B-214B through the LD matrices, unlabeled but identified by machine coded x-column entries for candidate words c1-c4, and the LD/OCR-Key matrices 201B-204B, respectively, for the corresponding character identity-based and character shape-based matching algorithms are tabulate in FIG. 3. FIG. 3 itemizes the total errors for the character identity-based matching function, as described in FIG. 1B, into the total number of insertion, deletion, and substitution errors. FIG. itemizes the total errors for the character shape-based matching function, as described in FIG. 2B, into the total number of class insertion, deletion, and substitution errors, as well as itemizing the number of class cardinality (cc) errors associated with each class.

An interpretation of the results shown in Table 300, in FIG. 3, is as follows:

(A) A strict, standard, character identity-based LD measurements provides for critical paths 111B-114B that present a total number of errors count, such that the following candidate word ranking is ascertained:
 (1) c1='imitation' errors=1
 (2) c2='immigration' errors=2
    c3='irrigation'
 (4) c4='irritation' errors=3

(B) A strict, character shape-based LD/OCR-Key measurements provides for critical paths 211B-214B that present a combination of class errors and class cardinality (cc) differences, such that the following candidate word ranking is ascertained:
(1) c1='irrigation' class errors/cardinality=0/0
(2) c2='irritation' class errors/cardinality=1/0
   c3='imitation'
(4) c4='immigration' class errors/cardinality=1/3

In this example, the LD/OCR-Key trellis set 201B-214B and associated critical paths 211B-214B outperforms the LD trellis set and associated critical paths 111B-114B, in this case correctly identifying 'irrigation' as the originally scanned word by the OCR processor from the original handwritten text. An additional note: the ranking of the candidate word c4='irritation' also improved—from rank=4 to rank=2—by strict reliance on the LD/OCR-Key trellis set 201B-204B over the standard LD trellis set, as instructed by the presentation in FIG. 1B. The improvement in ranking is owed to the character shape-match algorithm associated with the LD/OCR-Key trellis set 201B-214B, superior in this example as interpretation and implementation of the new method for correction and verification of OCR character strings in accordance with the methods of one embodiment of the present invention.

FIG. 3 explicitly registers the LD/OCR-Key measurements from the four example candidate words presented in FIG. 2B. As previously stated, a strict measurement of character identification mismatches—that is, a strict LD measurement as described in FIGS. 1A-B—may provide for the selection of candidate word c3='imitation' as the preferred match. Based on the tabulated results for the LD/OCR-Key measurement 300, as shown in FIG. 3, a competing candidate word c1='irrigation' may provide for a better match in light of a lower LD/OCR-Key mismatch measurement, as represented in the right-most column of table 300.

In the example provided in FIGS. 2A-B and 3, the inclusion of a character shape matching function provides for a superior AH search tree and LD/OCR-Key measurement error, correctly identifying the candidate word c1='irrigation' as the match to the originally scanned word 'irrigation,' scanned incorrectly as the character string 'imigation,' and identified incorrectly, according to the tabulated results from table 300, as the candidate word c3='imitation' for the standard character identity-based matching, a strict machine code matching.

But, what if by strictly limited to the character shape matching algorithm—the LD/OCR-Key measurement—in a second example, leads to the incorrect candidate word selection; that is, by including the second AH search tree and the LD/OCR-Key measurement, described in FIGS. 2A-B, the search tree is pointed in the wrong direction?

FIGS. 4A-B present such examples, whereby returning to a strict first AH search tree and LD measurement, described in FIGS. 1A-B, directed only by character identity mismatches, provides for the best matched candidate word c*. But, how is this reconciled with the merging of the two AH search trees and the two LD measurements described in one embodiment of the present invention?

The answer to this highlights the power of one embodiment of the present invention. The examples presented in FIGS. 4A-B do not defeat the proposed second AH search tree and LD/OCR-Key measurement associated with character shapes, but rather highlight the power and flexibility of merging the two search and measurement strategies proposed in one embodiment of the present invention, whereby the merging of the two techniques identifies the correct candidate word.

The example shown in FIG. 4A can be summarized as follows:
(1.) A character string in a handwritten document, for example, such as the character string 'lineage,' is incorrectly scanned by a standard OCR software function and rendered in a .pdf document as the character string—the target word—w='limeage.'
(2.) The target word w='limeage' is concurrently character identity and character shape matched by overlaid LD and LD/OCR-Key measurements, as previously described with respect to FIGS. 1B and 2B.
(3.) Two example candidate words cj='lineage' and cj='mileage,' the latter being an anagram of the target word 'limeage,' are presented as x-coordinate character string entries into respective matrices 401A and 401B; the y-coordinate character string entry in both matrices is, of course, the target word w='limeage.'
(4.) Both matrices 401A and 402A are assessed and tabulated by respective tables 405A and 406A, as previously describe in FIG. 3 with respect to LD and LD/OCR-Key measurements performed in FIGS. 1B and 2B.

The standard character identity matching associated with the LD measurement, as described in FIG. 1B, is illustrated by dashed lines or grids in the matrices 401A and 402A. The character shape matching associated with the LD/OCR-Key measurement, as described in FIG. 2B, is illustrated by solid lines or grids in the matrices 401A and 402A. Transitions associated with the critical paths 410A and 411A through the respective trellises 401A and 402A are presented explicitly in accordance with the rules previously set forth with regard to FIGS. 1B and 2B.

The results for the LD/OCR-Key measurement, tabulated in the lower row of respective tables 405A and 406A, provides for a scoring preference associated with the candidate word cj='mileage.' That is, as a function strictly of character shape, the character string 'mileage' matches the target word 'mileage' with a total of zero deletion, substitution, and insertion errors, and additionally, the candidate character string 'mileage' matches the target word w='limeage' with zero cardinality (cc) errors. A total scoring of: 0 (i0).

By contrast, the same LD/OCR-Key measurement, as applied to the candidate word cj='lineage,' provides for a total measurement error, an LD/OCR-Key mismatch error of: 0 (i1). That is, matching the candidate word cj='lineage' to the target word w='limeage' results in no deletion, substitution, or insertion errors, but a cardinality mismatch between the substrings 'lin' and 'lim' of: i(1). With a lower LD/OCR-Key mismatch scoring, as registered in tables 405A and 406A, the candidate word c='mileage' is selected. The result is incorrect.

But, embodiments of the present invention do not rely on just the character identity matching function to the exclusion of the character shape matching function, nor do embodiments of the present invention rely on just or the character shape matching function to the exclusion of the character identity matching function, but rather merges the two functions. The principles governing the merging of the two functions, as embodied in the present invention, allow for a superior candidate word matching function then provided for by either of the two aforementioned matching functions applied independently.

The example in FIG. 4A is illustrative. By combining the respective LD and LD/OCR-Key scoring in tables 405A and 406A, the correct candidate word—that of cj='lineage'—is selected. For the example given in FIG. 4A, the formula for combining both character identity and character shape scoring—that is, results dictated by critical paths 410A and 411A through respective matrices 401A and 402A—may be summarized by the following equation:

$$\mathcal{E} = \ln(\text{freq})(w_L - e_{LD} - e_{LD/OCR\text{-}Key}) \quad (4)$$

Whereby, in Equation 4, 'freq' represents the frequency the candidate word appears in the associated .pdf document or collection of .pdf documents, $w_L$ represents the length of the target word w, and $e_{LD}$ and $e_{LD/OCR\text{-}Key}$ represent the character identity and character shape mismatch errors, respectively; that is, the values registered, for example, in tables 405A and 406A, shown in FIG. 4.

Accordingly, in this example, the scoring is given as follows:

$$\mathcal{E}(\text{'mileage'}) = \ln(\text{freq}[\text{'mileage'}])(w_L - e_{LD} - e_{LD/OCR\text{-}Key}) = \ln(\text{freq})(6-2-0(i0)) \sim 4(i0)$$

$$\mathcal{E}(\text{'lineage'}) = \ln(\text{freq}[\text{'lineage'}])(w_L - e_{LD} - e_{LD/OCR\text{-}Key}) = \ln(\text{freq})(6-1-0(i1)) \sim 5(i1) \quad (4A)$$

For the given example, it is assumed the relative frequencies of the two candidate words 'mileage' and 'lineage' are approximately equal. From Equation 4.2, it can be seen that the candidate word 'lineage' scores higher than the candidate word 'lineage' in the merged error function $\mathcal{E}$. As a result, the correct candidate word cj='lineage' is selected as the preferred candidate word c* match to the target word w='limeage.'

A second example addressing the same issue is shown in FIG. 4B. The second example also considers an incorrect OCR scanning of the word 'lineage.' The second example, shown in FIG. 4B, can be summarized as follows:

(1.) A character string in a handwritten document, for example, such as the character string 'lineage,' is incorrectly scanned by a standard OCR software function and rendered in a .pdf document, this time as the character string—the target word—w='linage.'

(2.) The target word w='linage' is concurrently character identity and character shape matched by overlaid LD and LD/OCR-Key measurements, as previously described with respect to FIGS. 1B and 2B.

(3.) Two example candidate words cj='lineage' and cj='image' are presented a x-coordinate character string entries into respective matrices 401B and 402B; the y-coordinate character string entry in both matrices is, of course, the target word w='linage.'

(4.) Both matrices 401B and 402B are assessed and tabulated by respective tables 405B and 406B, as previously describe in FIG. 3 with respect to LD and LD/OCR-Key measurements performed in FIGS. 1B and 2B.

The standard character identity matching associated with the LD measurement, as described in FIG. 1B, is illustrated by dashed lines or grids in the matrices 401B band 402B. The character shape matching associated with the LD/OCR-Key measurement, as described in FIG. 2B, is illustrated by solid lines or grids in the matrices 401B and 402B. Transitions associated with the critical paths 405B and 406B through the respective trellises 401B and 402B are presented explicitly in accordance with the rules previously set forth with regard to FIGS. 1B and 2B.

The results for the LD/OCR-Key measurement, tabulated in the lower row of respective tables 405B and 406B, provides for a scoring preference associated with the candidate word cj='image.' That is, as a function strictly of character shape, the character string 'image' matches the target word 'linage' with a total of zero deletion, substitution, and insertion errors, and additionally, the candidate character string 'image' matches the target word w='linage' with aero cardinality (cc) errors. A total scoring of: 0 (i0).

By contrast, the same LD/OCR-Key measurement, as applied to the candidate word cj='lineage,' provides for a total measurement error, an LD/OCR-Key mismatch error of: 1 (i0). With a lower LD/OCR-Key mismatch scoring, as registered in tables 405B and 406B, the candidate word cj='image' is selected. The result is incorrect.

But, by merging the character identity and the character shape matching algorithms, the correct candidate word cj='lineage' is selected. Accordingly, in this example, the scoring is given as follows:

$$\mathcal{E}(\text{'image'}) = \ln(\text{freq}[\text{'image'}])(w_L - e_{LD} - e_{LD/OCR\text{-}Key}) = \ln(\text{freq})(6-2-0(i0)) \sim 4(i0)$$

$$\mathcal{E}(\text{'lineage'}) = \ln(\text{freq}[\text{'lineage'}])(w_L - e_{LD} - e_{LD/OCR\text{-}Key}) = \ln(\text{freq})(6-1-1(i0)) \sim 4(i0) \quad (4B)$$

For the second example, the associated error functions $\mathcal{E}$ are equal. However, it can be appreciated that the error function $\mathcal{E}$, as constructed in Equations 4A-B, unfairly penalizes character deletion, substitution, and insertion errors in smaller cardinality blocks; that is, it may be more accurate to weigh or register just once the deletion, substitution, and insertion errors wherein the cardinality equals one. In that case, both the deletion and substitution error are counted in the character identity mismatch between the target word substring 'lin' and the candidate word substring 'im,' but the insertion error between the target word substring 'age' and the candidate word substring 'eage' counts just once, whereby both substrings lie outside the matrix block where the cardinality is greater than one. As such, for similar relative frequency values, the error function $\mathcal{E}$ ('lineage') > $\mathcal{E}$ ('image'), and the candidate word cj='lineage' is correctly selected as the preferred candidate word c* match for, in this case, the target word w='linage.'

FIG. 5 presents an explicit example table 500 mapping character identities—that is, machine code character representations—onto character shape classes ($\mathcal{C}$) and class cardinalities (cc), in accordance with an example embodiment of the present invention. Table 500, shown in FIG. 5, is taken directly from the Diploma Thesis: "*Unsupervised Post-Correction of OCR Errors*," Kai Niklas, Hanover, Jun. 11, 2010.

It is important to note that Table 500 is neither unique nor complete. That is, one embodiment of the present invention allows for any self-consistent incarnation of Table 500, and for the definition of multiple and overlapping character shape classes and sub-classes, and associated cardinalities. In fact, the examples provided for by FIGS. 2A-B, 3, and 4 not only follow an alternative Table for character shape mapping, but also allow for the integration of multiple shapes and features in multiple character shape classifications. As but one example, multiple features and multiple character shape classifications is missing in the example character shape mapping function of FIG. 5.

Returning to the examples set forth with respect to FIGS. 4A-B, it may be advantageous in a further embodiment for the OCR post-processor of one embodiment of the present invention to include calculations/determinations and values for the 'ln(freq['char.string'])' function appearing in Equations 4 and 4A-B. In the previous examples, the function was held constant, with the assumption that the frequency that the proposed candidate words appeared in the associated .pdf document or collection of documents was a constant. But this assumption may be incorrect, and may falsely penalize the selection of more commonly appearing words.

As such, in a further embodiment of the present invention, the 'freq' function may be constructed, in one example, by dividing the total number of candidate word detections recorded by the total number of words recorded in the associated document. The 'ln' function, as given in Equations 4 and 4A-B, is a monotonic function, sharply sloped upward for values between zero and one, amplifying small differences in relative frequencies between competing candidate words.

In still a further embodiment, the 'ln(freq['char.string'])' function in Equations 4 and 4A-B may be replaced by a second function defined as:

$$\text{freq['char.string']} \times \ln(\text{freq['char.string']}) \tag{5A}$$

Equation 5A appears more complicated, but meaning of Equation 5A is more straightforward. Equation 5A is the self-entropy $\mathcal{H}$ of the 'char.string' or candidate word in question. The present embodiment, with a self-entropy term included as a weighting function in the error functions $\mathcal{E}$ of Equations 4 and 4A-B—that is, the merging functions—rewards candidate words appearing more frequently, but penalizes candidate words appearing too frequently, in addition to penalizing candidate words which appear with a very low frequency. In this way, the error functions E of Equations 4 and 4A-B are not overly biased by a collection of overly used words, or more insidiously, by a consistent collection of errors resulting from biases in the OCR scan and subsequent .pdf entry to prompt the OCR post-processor of one embodiment of the present invention to repeatedly make the same interpretation error.

In such an embodiment, the self-entropy function $\mathcal{H}$ itself may be summed for the full set or full collection of words recorded in the associated .pdf document or documents, providing for the total entropy (H) of the associated document. The total entropy function (H) for the full document is defined by the following:

$$H = -\Sigma_{\forall document\ words} \text{freq}_{word} \times \ln(\text{freq}_{word}) \tag{5B}$$

The entropy function (H), given in Equation 5B, may provide for an analysis that determines how random word usage may occur in the associated set of documents. Conversely, the entropy function (H) may provide information as to the repetitiveness—the repeated usage of the same words or phrases—in the associated document. Information from Equation 5B may provide for, in some embodiments, for an approximation of processing time or power, or OCR confidence factors associated with the present set of documents.

Exemplary embodiments of the present invention have been described herein. Embodiments of the present invention are not limited to these examples. These examples are presented herein for purposes of illustration, and not limitation. Alternatives (including equivalents, extensions, variations, deviations, etc., of those described herein) may be apparent to persons skilled in the relevant art(s) based in the teachings contained herein. Such alternatives fall within the scope and spirit of the invention.

All publications, patents, and patent applications mentioned in this specification are herein incorporated by reference to the same extent as if each individual publication, patent, or patent application was specifically and individually indicated to be incorporated by reference.

That which is claimed:

1. A method for correcting optical character recognition (OCR) errors from an OCR scan result, comprising:
   registering an OCR machine code from the OCR scan result;
   mapping the registered OCR machine code to one or more of an OCR-Key according to one or more character shape functions by:
      mapping from one or more segments of an individual character represented by the OCR machine code to one or more character shape classes;
      mapping from a combination of one or more characters represented by the OCR machine code to the one or more character shape classes;
      mapping according to a character shape function comprising a repetition encoding of a characteristic shape, wherein the repetition encoding is designated as a cardinality of the one or more character shape classes;
      mapping according to a character shape function, wherein a set of consecutive characters in a common character shape class are grouped into a single class with a cardinality equal to the sum of the cardinalities of each of the consecutive characters; and
      mapping to the set of character shape classes comprising disjoint classes, overlapping classes, and combinations thereof;
   selecting, from a dictionary, a first set of candidate words as possible matches to the registered OCR machine code;
   selecting, from the dictionary, a second set of candidate words as possible matches to the OCR-Key;
   calculating a set of errors between the second set of candidate words and the OCR machine code and the OCR-Key; and
   selecting a preferred candidate word from the second set of candidate words with the smallest set of errors.

2. The method of claim 1, wherein selecting a second set of candidate words comprises activating a character shape anagram hash (AH-S) by:
   mapping from the OCR-Key to an AH-S geometry;
   constructing an AH-S search tree in the AH-S geometry; and
   searching the AH-S search tree.

3. The method of claim 2, wherein the AH-S geometry comprises:
   a unique point for each candidate OCR-Key and its respective set of OCR-Key anagrams;
   orthogonal groups of candidate OCR-Keys and their set of respective anagrams, wherein the orthogonal groups differ from the registered machine code OCR-Key by one or more of a character shape class deletion, a character shape class substitution, and a character shape class insertion, and
   the cardinality, wherein the cardinality of a character shape class may vary with the unique points and the orthogonal groups.

4. The method of claim 3, wherein calculating a set of errors between the second set of candidate words and the registered OCR machine code and the OCR-Key comprises:
   a first Levenshtein-Distance (LD) measure between the second set of candidate words and the registered OCR machine code; and
   a second Levenshtein-Distance (LD/OCR-Key) measure between the second set of candidate words and the OCR-Key.

5. The method of claim 4, wherein the LD measure and the LD/OCR-Key measure comprises at least one of an LD matrix or LD trellis and at least one of an LD/OCR-Key matrix or LD/OCR-Key trellis.

6. The method of claim 4, wherein the LD and LD/OCR-Key trellises are traversed by more than one path to all possible paths, wherein the traversing the LD and the LD/OCR-Key trellises comprises a step-by-step registering of an LD and an LD/OCR-Key trellis step error at each step.

7. The method of claim 6, wherein a sequential collection of LD and LD/OCR-Key trellis step errors comprises an LD and an LD/OCR-Key critical path, wherein the critical path is a minimum error path.

8. The method of claim 7, wherein the LD and the LD/OCR-Key critical paths associated with the LD trellis and the LD/OCR-Key trellis are constructed concurrently.

9. The method of claim 8, wherein the smallest set of errors is a function of the LD and LD/OCR-Key critical paths.

10. The method of claim 9, wherein the function comprises:
the LD trellis step error associated with the last step in the LD critical path; and
the LD/OCR-Key trellis step error associated with the last step in the LD/OCR-Key critical path.

11. The method of claim 10, wherein the function is applied to the second set of candidate words.

12. The method of claim 11, wherein the function further comprises:
differences from the registered machine code OCR-Key by one or more of a character shape class deletion, a character shape class substitution, and a character shape class insertion, and;
the cardinality of the character shape class.

13. The method of claim 11, wherein the function further comprises a frequency of the respective second set of candidate words.

14. An apparatus for correcting optical character recognition (OCR) errors from an OCR scan result, said apparatus comprising a processing device and a memory-storing computer-executable instructions, the memory and the computer-executable instructions configured to, with the processing device, cause the apparatus to:
register an OCR machine code from the OCR scan result;
map the registered OCR machine code to one or more of an OCR-Key according to one or more character shape functions by:
mapping from one or more segments of an individual character represented by the OCR machine code to one or more character shape classes;
mapping from a combination of one or more characters represented by the OCR machine code to the one or more character shape classes;
mapping according to a character shape function comprising a repetition encoding of a characteristic shape, wherein the repetition encoding is designated as a cardinality of the one or more character shape classes;
mapping according to a character shape function, wherein a set of consecutive characters in a common character shape class are grouped into a single class with a cardinality equal to the sum of the cardinalities of each of the consecutive characters; and
mapping to the set of character shape classes comprising disjoint classes, overlapping classes, and combinations thereof;
select, from a dictionary, a first set of candidate words as possible matches to the registered OCR machine code;
select, from the dictionary, a second set of candidate words as possible matches to the OCR-Key;
calculate a set of errors between the second set of candidate words and the OCR machine code and the OCR-Key; and
select a preferred candidate word from the second set of candidate words with the smallest set of errors.

15. The apparatus of claim 14, wherein to select a second set of candidate words, the memory and the computer-executable instructions are further configured to, with the processing device, cause the apparatus to activate a character shape anagram hash (AH-S) by:
mapping from the OCR-Key to an AH-S geometry;
constructing an AH-S search tree in the AH-S geometry; and
searching the AH-S search tree.

16. The apparatus of claim 15, wherein the map to the AH-S geometry comprises:
a map to a unique point for each candidate OCR-Key and its respective set of OCR-Key anagrams;
a map to orthogonal groups of candidate OCR-Keys and their set of respective anagrams, wherein the orthogonal groups differ from the registered machine code OCR-Key by one or more of a character shape class deletion, a character shape class substitution, and a character shape class insertion, and
the cardinality, wherein the cardinality of a character shape class may vary with the unique points and the orthogonal groups.

17. The apparatus of claim 16, wherein to calculate a set of errors between the second set of candidate words and the registered OCR machine code and the OCR-Key comprises the memory and the computer-executable instructions are further configured to, with the processing device, cause the apparatus to:
calculate a first Levenshtein-Distance (LD) measure between the second set of candidate words and the registered OCR machine code; and
calculate a second Levenshtein-Distance (LD/OCR-Key) measure between the second set of candidate words and the OCR-Key.

18. The apparatus of claim 17, wherein the LD measure and the LD/OCR-Key measure comprises at least one of an LD matrix or LD trellis and at least one of an LD/OCR-Key matrix or LD/OCR-Key trellis.

19. The apparatus of claim 18, wherein the LD and LD/OCR-Key trellises are traversed by more than one path to all possible paths, wherein the traversing the LD and the LD/OCR-Key trellises comprises a step-by-step registering of an LD and an LD/OCR-Key trellis step error at each step.

20. The apparatus of claim 19, wherein a sequential collection of LD and LD/OCR-Key trellis step errors comprises an LD and an LD/OCR-Key critical path, wherein the critical path is a minimum error path.

21. The apparatus of claim 20, wherein the LD and LD/OCR-Key critical paths associated with the LD trellis and the LD/OCR-Key trellis are constructed concurrently.

22. The apparatus of claim 21, wherein the smallest set of errors is a function of the LD and LD/OCR-Key critical paths.

23. The apparatus of claim 22, wherein the function further comprises:
the LD trellis step error associated with the last step in the LD critical path; and
the LD/OCR-Key trellis step error associated with the last step in the LD/OCR-Key critical path.

24. The apparatus of claim 23, wherein the function is applied to the second set of candidate words.

25. The apparatus of claim 24, wherein the function further comprises:
differences from the registered machine code OCR-Key by one or more of a character shape class deletion, a character shape class substitution, and a character shape class insertion, and;
the cardinality of the character shape class.

26. The apparatus of claim 24, wherein the function further comprises a frequency of the respective second set of candidate words.

27. A non-transitory computer-readable medium storing machine-readable program code for causing, when executed, one or more devices to perform the following functions for correcting optical character recognition (OCR) errors from an OCR scan result:
 register an OCR machine code from the OCR scan result;
 map the registered OCR machine code to one or more of an OCR-Key according to one or more character shape functions by:
  mapping from one or more segments of an individual character represented by the OCR machine code to one or more character shape classes;
  mapping from a combination of one or more characters represented by the OCR machine code to the one or more character shape classes;
  mapping according to a character shape function comprising a repetition encoding of a characteristic shape, wherein the repetition encoding is designated as a cardinality of the one or more character shape classes;
  mapping according to a character shape function, wherein a set of consecutive characters in a common character shape class are grouped into a single class with a cardinality equal to the sum of the cardinalities of each of the consecutive characters; and
  mapping to the set of character shape classes comprising disjoint classes, overlapping classes, and combinations thereof;
 select, from a dictionary, a first set of candidate words as possible matches to the registered OCR machine code;
 select, from the dictionary, a second set of candidate words as possible matches to the OCR-Key;
 calculate a set of errors between the second set of candidate words and the OCR machine code and the OCR-Key; and
 select a preferred candidate word from the second set of candidate words with the smallest set of errors.

28. The non-transitory computer-readable medium of claim 27, wherein to select a second set of candidate words, the machine-readable program code causes, when executed, one or more devices to activate a character shape anagram hash (AH-S) by:
 mapping from the OCR-Key to an AH-S geometry;
 constructing an AH-S search tree in the AH-S geometry; and
 searching the AH-S search tree.

29. The non-transitory computer-readable medium of claim 28, wherein to map to the AH-S geometry, the machine-readable program code causes, when executed, one or more devices to perform the following functions:
 map to a unique point for each candidate OCR-Key and its respective set of OCR-Key anagrams;
 map to orthogonal groups of candidate OCR-Keys and their set of respective anagrams, wherein the orthogonal groups differ from the registered machine code OCR-Key by one or more of a character shape class deletion, a character shape class substitution, and a character shape class insertion, and
 register the cardinality, wherein the cardinality of a character shape class may vary with the unique points and the orthogonal groups.

30. The non-transitory computer-readable medium of claim 29, wherein to calculate a set of errors between the second set of candidate words and the registered OCR machine code and the OCR-Key, the machine-readable program code causes, when executed, one or more devices to perform the following functions:
 calculate a first Levenshtein-Distance (LD) measure between the second set of candidate words and the registered OCR machine code; and
 calculate a second Levenshtein-Distance (LD/OCR-Key) measure between the second set of candidate words and the OCR-Key.

31. The non-transitory computer-readable medium of claim 30, wherein the LD measure and the LD/OCR-Key measure comprises at least one of an LD matrix or LD trellis and at least one of an LD/OCR-Key matrix or LD/OCR-Key trellis.

32. The non-transitory computer-readable medium of claim 31, wherein the LD and LD/OCR-Key trellises are traversed by more than one path to all possible paths, wherein the traversing the LD and the LD/OCR-Key trellises comprises a step-by-step registering of an LD and an LD/OCR-Key trellis step error at each step.

33. The non-transitory computer-readable medium of claim 32, wherein a sequential collection of LD and LD/OCR-Key trellis step errors comprises an LD and an LD/OCR-Key critical path, wherein the critical path is a minimum error path.

34. The non-transitory computer-readable medium of claim 33, wherein the LD and the LD/OCR-Key critical paths associated with the LD trellis and the LD/OCR-Key trellis are constructed concurrently.

35. The non-transitory computer-readable medium of claim 34, wherein the smallest set of errors is a function of the LD and LD/OCR-Key critical paths.

36. The non-transitory computer-readable medium of claim 35, wherein the function further comprises:
 the LD trellis step error associated with the last step in the LD critical path; and
 the LD/OCR-Key trellis step error associated with the last step in the LD/OCR-Key critical path.

37. The non-transitory computer-readable medium storing machine-readable program code of claim 36, wherein the function is applied to the second set of candidate words.

38. The non-transitory computer-readable medium storing machine-readable program code of claim 37, wherein the function further comprises:
 differences from the registered machine code OCR-Key by one or more of a character shape class deletion, a character shape class substitution, and a character shape class insertion, and;
 the cardinality of the character shape class.

39. The non-transitory computer-readable medium storing machine-readable program code of claim 37, wherein the function further comprises a frequency of the respective second set of candidate words.

* * * * *